United States Patent
Gupta et al.

(10) Patent No.: US 9,923,243 B2
(45) Date of Patent: Mar. 20, 2018

(54) SILICONE EPOXY ETHER COMPOSITIONS, METHODS FOR MAKING SAME AND USES THEREFOR

(71) Applicants: Neeraj Gupta, Bangalore (IN); Karthikeyan Sivasubramanian, Bangalore (IN); Monjit Phukan, Bangalore (IN)

(72) Inventors: Neeraj Gupta, Bangalore (IN); Karthikeyan Sivasubramanian, Bangalore (IN); Monjit Phukan, Bangalore (IN)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 532 days.

(21) Appl. No.: 14/371,491

(22) PCT Filed: Jan. 10, 2013

(86) PCT No.: PCT/US2013/020983
§ 371 (c)(1),
(2) Date: Jul. 10, 2014

(87) PCT Pub. No.: WO2013/106537
PCT Pub. Date: Jul. 18, 2013

(65) Prior Publication Data
US 2015/0050560 A1   Feb. 19, 2015

Related U.S. Application Data

(60) Provisional application No. 61/584,961, filed on Jan. 10, 2012.

(51) Int. Cl.
| | | |
|---|---|---|
| H01M 4/13 | (2010.01) | |
| H01M 10/0569 | (2010.01) | |
| H01M 10/0565 | (2010.01) | |
| H01G 11/60 | (2013.01) | |
| H01G 11/64 | (2013.01) | |
| H01M 10/052 | (2010.01) | |

(52) U.S. Cl.
CPC ........ *H01M 10/0569* (2013.01); *H01G 11/60* (2013.01); *H01G 11/64* (2013.01); *H01M 10/052* (2013.01); *H01M 10/0565* (2013.01); *H01M 2300/0028* (2013.01); *H01M 2300/0082* (2013.01); *Y02E 60/13* (2013.01)

(58) Field of Classification Search
CPC .................................................... H01M 4/13
See application file for complete search history.

(56) References Cited

U.S. PATENT DOCUMENTS

| | | |
|---|---|---|
| 6,180,287 B1 | 1/2001 | Watanabe et al. |
| 6,337,383 B1 | 1/2002 | West et al. |
| 6,858,351 B2 | 2/2005 | Miura et al. |
| 6,887,619 B2 | 5/2005 | West et al. |
| 6,936,382 B2 | 8/2005 | Mikhaylik et al. |
| 7,466,539 B2 | 12/2008 | Dementiev et al. |
| 7,473,491 B1 | 1/2009 | Amine et al. |
| 7,588,859 B1 | 9/2009 | Oh et al. |
| 7,612,985 B2 | 11/2009 | Dementiev et al. |
| 7,695,860 B2 | 4/2010 | Amine et al. |
| 7,902,299 B2 | 3/2011 | Kerr et al. |
| 2003/0124432 A1 | 7/2003 | Miura et al. |
| 2004/0143128 A1 | 7/2004 | Ichinohe |
| 2004/0157065 A1 | 8/2004 | Miyatake et al. |
| 2004/0197668 A1 | 10/2004 | Jung et al. |
| 2005/0106470 A1 | 5/2005 | Yoon et al. |
| 2005/0170254 A1 | 8/2005 | West et al. |
| 2006/0035154 A1 | 2/2006 | West et al. |
| 2009/0035656 A1 | 5/2009 | Lee et al. |
| 2011/0269029 A1 | 11/2011 | Gellett et al. |
| 2012/0225352 A1* | 9/2012 | Abouimrane ............ H01B 1/18 429/211 |
| 2013/0084490 A1 | 4/2013 | Zhang et al. |

FOREIGN PATENT DOCUMENTS

JP    2001-118578 A    4/2001

OTHER PUBLICATIONS

Supplementary European Search Report, EP 13735575.3-1360, dated Nov. 13, 2015.
International Search Report and Written Opinion of the International Searching Authority, PCT/US2013/020983, dated Mar. 26, 2013.
Wright, P.V., "Complexes of alkali metal ions with polyethylene oxide)," Polymer, vol. 14, Nov., pp. 589 (1973).
Rossi et al., "Silicon-Containing Carbonates—Synthesis, Characterization, and Additive Effects for Silicon-Based Polymer Electrolytes," Silicon, pp. 201-208. (2010).
Rossi and West, "Silicon-containing liquid polymer electrolytes for application in lithium ion batteries," Polymer Int., Society of Chemical Industry, vol. 58, pp. 267-272. (2009).
Armand et al. "Polymeric Solid Electrolytes," Second International Conference on Solid Electrolytes, St. Andrews, UK, Sep. 20-22, 1978, Paper 6.5.

* cited by examiner

*Primary Examiner* — Jacob Marks
(74) *Attorney, Agent, or Firm* — McDonald Hopkins, LLC; Joseph Waters

(57) ABSTRACT

The present invention relates to silicone epoxy compositions, methods for making same and uses therefore. In one embodiment, the silicone epoxy ether compositions of the present invention are silane epoxy polyethers that contain at least one epoxy functionality. In another embodiment, the silicone epoxy ether compositions of the present invention are siloxane epoxy polyethers that contain at least one epoxy functionality. In still another embodiment, the present invention relates to silicone epoxy polyether compositions that are suitable for use as an electrolyte solvent in a lithium-based battery, an electrochemical super-capacitors or any other electrochemical device.

39 Claims, No Drawings

SILICONE EPOXY ETHER COMPOSITIONS, METHODS FOR MAKING SAME AND USES THEREFOR

CROSS REFERENCE TO RELATED APPLICATIONS

This application is a 35 U.S.C. 371 national stage filing and claims priority to PCT Application No. PCT/US2013/020983, entitled "Silicone Epoxy Ether Compositions, Methods for Making Same and Uses Therefor" filed on Jan. 10, 2013, which claims the benefit of U.S. Provisional Application No. 61/584,961 entitled "Silicone Epoxy Ether Compositions, Methods for Making Same and Uses Therefor" filed on Jan. 10, 2012, both of which are incorporated herein in their entirety by reference.

FIELD OF THE INVENTION

The present invention relates to silicone epoxy compositions, methods for making same and uses therefore. In one embodiment, the silicone epoxy ether compositions of the present invention are silane epoxy polyethers that contain at least one epoxy functionality. In another embodiment, the silicone epoxy ether compositions of the present invention are siloxane epoxy polyethers that contain at least one epoxy functionality. In still another embodiment, the present invention relates to silicone epoxy polyether compositions that are suitable for use as an electrolyte solvent in a lithium-based battery and other energy storage devices.

BACKGROUND OF THE INVENTION

The majority of lithium ion batteries use a mix of alkyl carbonate based liquid solvents containing a lithium salt as electrolytes. These solvents when used in conjunction with a lithium salt have the ability to form stable passive films around the anode and cathode, a characteristic essential for smooth and efficient functioning of the battery. However, these electrolytes are highly reactive and flammable, and therefore potentially unsafe. Thus, the batteries employing such electrolytes can catch fire or explode especially when overcharged or subjected to temperatures exceeding 125° C. to 130° C.

Given the above, it would be desirable that an alternate electrolyte solvent be found that could provide safer lithium ion batteries. One possible alternative electrolyte solvent disclosed in various publications is a silicone polyether. These solvents have very high flash points (usually above 250° C.) and possess much better flame-retardant properties compared to the alkyl carbonate solvents commonly utilized in lithium batteries.

One of the disadvantages with organic polymer compositions with respect to their usage in Li ion batteries is that such compositions in general have extremely poor ionic conductivities (about $10^{-14}$ S/cm) due to the low mobility of the ionic species in such systems. One possible solution was discussed by Wright (see, e.g., P. V. Wright; *Polymer;* 1973; 14; p. 589) who found that polyethylene oxides (PEO) possess several orders of magnitude greater ionic conductivities (about $10^{-6}$ S/cm) compared to other solid polymers. This increase in conductivity was explained by the ability of the polyethylene oxide chains in the polymer to transfer lithium ions. The transfer occurs by chain hopping, which is facilitated by a high degree of segmental motion of polyethylene oxide chains. The preparation of secondary lithium ion batteries employing such compounds as an electrolyte was proposed by Armand et al. (see, e.g., Armand et al.; *Second International Conference on Solid Electrolytes;* St. Andrews, UK; $20^{th}$ to 22 Sep. 1978; Paper 6.5).

Given the disclosure contained in these two publications, it was shown that a polyethylene oxide (PEO) complexed with an alkali metal salt can act as an ionic conductor but its ionic conductivity was too low (about $10^{-6}$ S/cm) at room temperature for use in any practical application. This was mainly attributed to PEO crystallinity.

With regard to alkyl carbonate-based electrolytes used in lithium ion batteries, these compounds typically have ionic conductivities in the $10^{-3}$ S/cm to $10^{-2}$ S/cm range. One major requirement in lithium ion batteries, especially in order to achieve a high power density, has been to achieve an ionic conductivity greater than $10^{-3}$ S/cm at room temperature (i.e., about 25° C.). Although silicone polyethers have been studied for over two decades as possible electrolyte solvent candidates for lithium ion batteries to achieve this performance level the majority of these polyethers have ionic conductivities that are less than $10^{-3}$ S/cm.

Turning to United States Patent Application Publication No. 2009/0035656, this publication discloses a siloxane composition that contains a glycidyl ether functionality. One of the compounds disclosed in this publication is a silane alkoxy glycidyl ether (e.g., dimethoxy or diethoxy silane glycidyl ether as shown in Formula (I) below). No ionic conductivity data is reported in the patent. Coin cell tests done using a lithium salt (1M $LiClO_4$) dissolved in this solvent reports a 69% charge discharge efficiency.

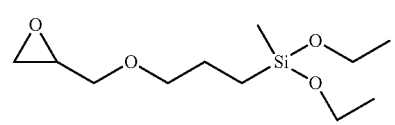

(I)

Turning to U.S. Pat. No. 7,695,860, this patent discloses siloxane polyether electrolytes with the polyether appended on the siloxane chain without a spacer. Such electrolytes are stated to provide higher ionic conductivities when compared to those with a spacer. The general formula for such compounds is illustrated below in Formula (II) where n and m are numbers (whole or fractional) that represent the number of repeating units as defined in U.S. Pat. No. 7,695,860. In one embodiment (Example 2 of U.S. Pat. No. 7,695,860), n is equal to 7 m is equal to about 6.3; $R_1$, $R_2$, $R_3$, $R_5$, $R_6$, $R_7$, $R_8$, $R_9$ and $R_{10}$ are all methyl ($—CH_3$) groups; and $R_4$ is selected from a group shown in Formula (III) below where, for example, k is equal to 3.

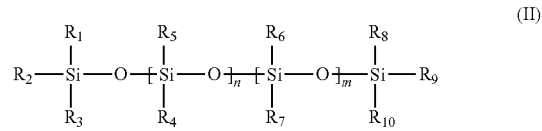

(II)

(III)

Turning to United States Patent Application Publication No. 2005/0170254, this publication discloses silicone polyether oligomers (A) blended with silicone alkyl carbonate (B). LiBOB and LiTFSI salts are dissolved in, for example, a mixture of (A)+(B) or (C)+(B) based on the Formulas shown below. The silicone alkyl carbonate is mainly used to enhance the dissolution of the lithium salt in the given solvent. The maximum room temperature ionic conductivity reported in this publication is $0.2 \times 10^{-3}$ S/cm.

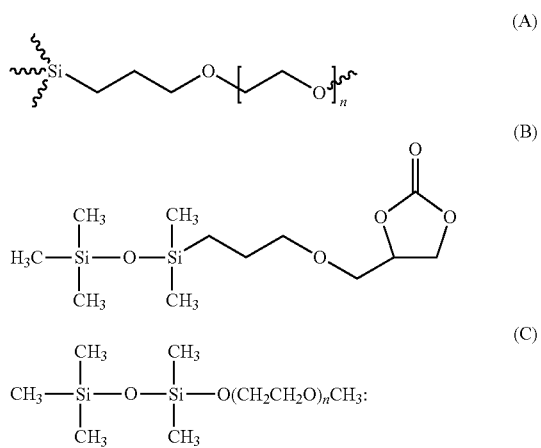

Turning to U.S. Pat. No. 7,466,539, this patent discloses electrolytes for double layer capacitors based on the following compounds as illustrated in the reactions below.

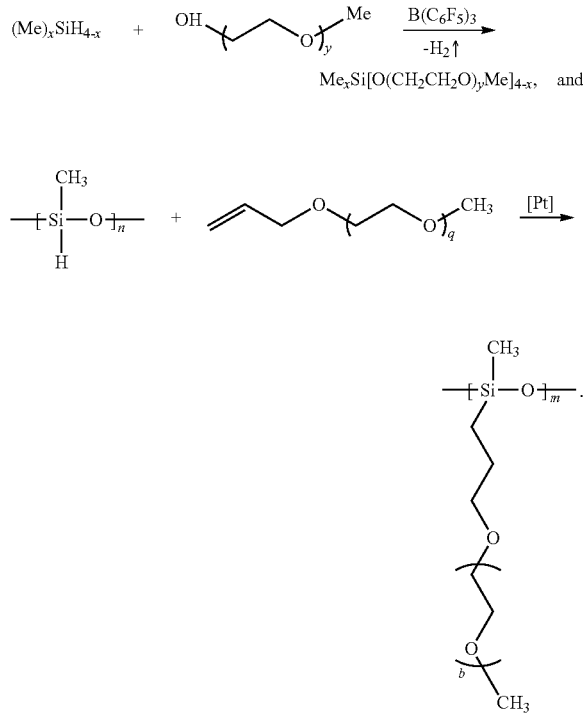

Accordingly, there is an unresolved need and desire for an electrolyte composition that can be utilized in a lithium-based battery.

SUMMARY OF THE INVENTION

The present invention relates to silicone epoxy compositions, methods for making same and uses therefore. In one embodiment, the silicone epoxy ether compositions of the present invention are silane epoxy polyethers that contain at least one epoxy functionality. In another embodiment, the silicone epoxy ether compositions of the present invention are siloxane epoxy polyethers that contain at least one epoxy functionality. As used herein, the term silicone compounds encompasses silane and siloxane compounds. In still another embodiment, the present invention relates to silicone epoxy polyether compositions that are suitable for use as an electrolyte solvent in a lithium-based battery, an electrochemical super-capacitor and any other electrochemical device.

In one embodiment, the present invention relates to a silicon-containing polyether electrolyte solvent composition comprising: (a) at least one compound selected from the compositions represented by the following structure:

$$M^1{}_a M^2{}_b D^1{}_c D^2{}_d T^1{}_e T^2{}_f Q_g$$

wherein $M^1$ is selected from $R^1R^2R^3SiO_{1/2}$ or M' a monovalent organic radical containing one or more heteroatoms O, N and/or S; wherein $M^2$ is selected from $R^4R^5R^6SiO_{1/2}$; wherein $D^1$ is selected from $R^7R^8SiO_{2/2}$ or D' a divalent organic radical containing one or more heteroatoms O, N and/or S; wherein $D^2$ is selected from $R^9R^{10}SiO_{2/2}$; wherein $T^1$ is selected from $R^{11}SiO_{3/2}$ or T' a trivalent organic radical containing one or more heteroatoms O, N and/or S; wherein $T^2$ is selected from $R^{13}SiO_{3/2}$; wherein Q is selected from $SiO_{4/2}$ or Q' a tetravalent organic radical containing one or more heteroatoms O, N and/or S; and wherein a, b, c, d, e, f, and g are independently selected from either zero or a positive integer subject to the provisos that 0<a+b+c+d+e+f+g<50 and b+d+f+g>0. In one embodiment, $R^1$, $R^2$, $R^3$, $R^5$, $R^6$, $R^7$, $R^8$, $R^{10}$, $R^{11}$, $R^{12}$ and $R^{14}$ are each independently selected from monovalent hydrocarbon radicals having from 1 to about 10 carbon atoms; monovalent hydrocarbon heteroatom-containing radicals having from 1 to about 10 carbon atoms wherein the one or more heteroatoms are selected from one or more halogens, O, N, or combinations of any two or more thereof; or monovalent polyalkylene oxide residuals. In one embodiment, $R^4$, $R^9$ and $R^{13}$ are each independently selected from monovalent radicals that contain an oxirane moiety, with the proviso that at least one of $R^1$, $R^2$, $R^3$, $R^5$, $R^6$, $R^7$, $R^8$, $R^{10}$, $R^{11}$, $R^{12}$, $R^{14}$, M', T' or Q' contains a polyalkylene oxide residual if none of $R^4$, $R^9$ and $R^{13}$ contains a polyalkylene oxide residual.

In another embodiment, the present invention relates to a silicon-containing polyether electrolyte solvent composition comprising: (a) at least one compound selected from the compositions represented by the following structures:

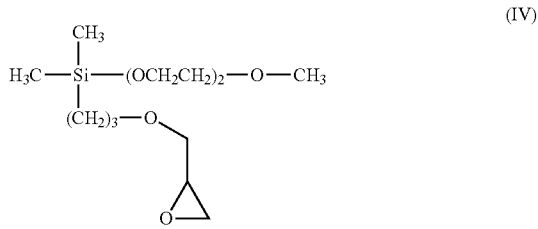

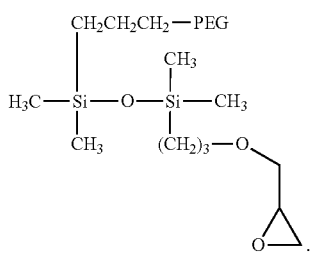

wherein the PEG portion of the compound of Formula (V) represents —$(OCH_2CH_2)_4OCH_3$.

In still another embodiment, the present invention relates to a method of producing a silicon-based electrolyte solvent composition according to the following reaction scheme:

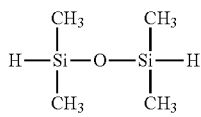

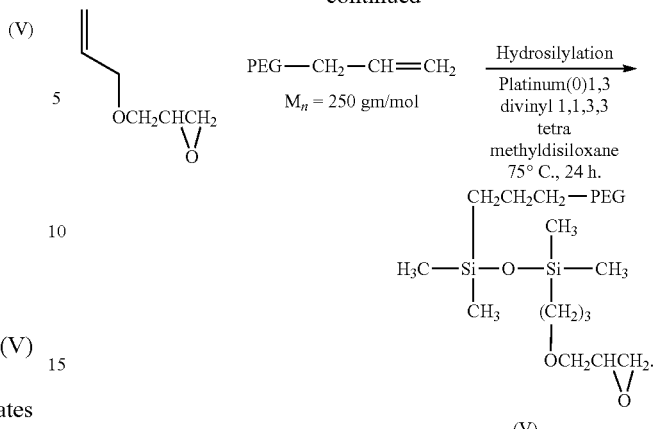

In still another embodiment, the present invention relates to a method of producing a silicon-based electrolyte solvent composition according to the following reaction scheme:

DETAILED DESCRIPTION OF THE INVENTION

The present invention relates to silicone epoxy compositions, methods for making same and uses therefore. In one embodiment, the silicone epoxy ether compositions of the present invention are silane epoxy polyethers that contain at least one epoxy functionality. In another embodiment, the silicone epoxy ether compositions of the present invention are siloxane epoxy polyethers that contain at least one epoxy functionality. As used herein, the term silicone compounds encompasses silane and siloxane compounds. In still another embodiment, the present invention relates to silicone epoxy polyether compositions that are suitable for use as an electrolyte solvent in a lithium-based battery, an electrochemical super-capacitor and any other electrochemical device.

Various alkyl carbonate-based electrolytes used in lithium ion batteries have room temperature ionic conductivities in the $10^{-3}$ S/cm to $10^{-2}$ S/cm range. One major requirement in lithium ion batteries and especially for high power density has been to achieve an ionic conductivity greater than $10^{-3}$ S/cm at room temperature. As noted above, silicone polyethers have been studied for over two decades as possible electrolyte solvent candidates for lithium ion batteries to achieve this magic figure. Again as noted above, the majority of the silicone polyethers have ionic conductivities that are less than $10^{-3}$ S/cm.

As utilized in the text and claims of the present patent application, silicones are meant to encompass both siloxane and silane compositions. The governing principle in synthesizing novel electrolytes is the solvent with a low viscosity. As ionic conductivity is inversely proportional to the viscosity of the solution and viscosity in general scales directly with molecular weight, therefore to increase the ionic conductivity low molecular weight silicone polyether copolymers or silicone polyether oligomers are considered as potential liquid electrolyte solvents.

As is known to those of skill in the art, one of the most widely used lithium salts, $LiPF_6$, dissolves poorly in silicone polyethers (maximum solubility of less than about 0.3 M) which results in poor ionic conductivities of such electrolytes. Alternate salts such as LiBOB (lithium bisoxalato borate) and LiTFSI (lithium bis(trifluoromethane sulfonyl) amide) can be considered as alternate electrolyte salts. However, these salts also have a limited solubility in silicone polyethers. Also these salts do not form as good SEI layers as does $LiPF_6$. The ionic conductivity for these solutions as reported in Rossi et al. (Polymer Int. 2009, 58, p. 267) and Rossi et al. (Silicon, 2010, 2, p. 201) is $0.89 \times 10^{-3}$ S/cm at room temperature when 0.8 M LiBOB salt is dissolved in a silane polyether and $0.2 \times 10^{-3}$ S/cm at room temperature when 0.8 M LiBOB is dissolved in a siloxane polyether.

In one embodiment, the present invention addresses the issue of low solubility of $LiPF_6$ salt by the selection of a novel silicone polyether solvent. In one embodiment, the silicone polyether solvent of the present invention contains at least one epoxy group (e.g., a glycidyl group) bonded to a silicone polyether. In one embodiment, when such a composition is utilized as an electrolyte solvent, $LiPF_6$ solubility increases to about 2 M in the epoxy silicone polyether solvent. Both the silane and siloxane versions of the epoxy polyethers are within the scope of the present invention and are discussed herein. In the silane version of the epoxy polyether (Formula (IV)), the increased solubility results in an ionic conductivity of about $1.15 \times 10^{-3}$ S/cm at room temperature when 1.25 M $LiPF_6$ is dissolved in an electrolyte solvent based on Formula (IV). With regard to an electrolyte solvent based on Formula (V) below, the ionic conductivity is measured to be $0.6 \times 10^{-3}$ S/cm at room temperature when 1 M $LiPF_6$ is dissolved.

While not wishing to be bound to any one theory, in one embodiment of the present invention the glycidyl functionality (e.g., the epoxy group) on the silicone (i.e., the silane compound or the siloxane compound) scavenges trace amounts of water present in the solvent. The glycidyl group can also further scavenge at least some of the HF that may be formed due to the reaction of $LiPF_6$ with water, thereby improving various performance criteria such as, but not limited to, the cycle life and shelf life of a lithium ion battery.

In one embodiment, the silicon-containing polyether of the present invention is either a silane and/or siloxane composition represented by the following structure:

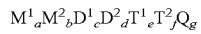

wherein $M^1$ is selected from $R^1R^2R^3SiO_{1/2}$ or M' (a monovalent organic radical containing one or more heteroatoms O, N and/or S); wherein $M^2$ is selected from $R^4R^5R^6SiO_{1/2}$; wherein $D^1$ is selected from $R^7R^8SiO_{2/2}$ or D' (a divalent organic radical containing one or more heteroatoms O, N and/or S); wherein $D^2$ is selected from $R^9R^{10}SiO_{2/2}$; wherein $T^1$ is selected from $R^{11}SiO_{3/2}$ or T' (a trivalent organic radical containing one or more heteroatoms O, N and/or S); wherein $T^2$ is selected from $R^{13}SiO_{3/2}$; wherein Q is selected from $SiO_{4/2}$ or Q' (a tetravalent organic radical containing one or more heteroatoms O, N and/or S); and wherein a, b, c, d, e, f, and g are independently selected from either zero or a positive integer subject to the provisos that $0<a+b+c+d+e+f+g<50$ and $b+d+f+g>0$. Regarding $R^1$, $R^2$, $R^3$, $R^5$, $R^6$, $R^7$, $R^8$, $R^{10}$, $R^{11}$, $R^{12}$ and $R^{14}$, these groups are each independently selected from monovalent hydrocarbon radicals having from 1 to about 10 carbon atoms; monovalent hydrocarbon heteroatom-containing radicals having from 1 to about 10 carbon atoms wherein the one or more heteroatoms are selected from one or more halogens (i.e., Br, Cl, F and/or I), O, N, or combinations of any two or more thereof; or monovalent polyalkylene oxide residuals. Regarding $R^4$, $R^9$ and $R^{13}$, these groups are each independently selected from monovalent radicals that contain an oxirane moiety, with the proviso that at least one of $R^1$, $R^2$, $R^3$, $R^5$, $R^6$, $R^7$, $R^8$, $R^{10}$, $R^{11}$, $R^{12}$, $R^{14}$, M', T' or Q' contains a polyalkylene oxide residual if none of $R^4$, $R^9$ and $R^{13}$ contains a polyalkylene oxide residual.

In one embodiment, the polyalkylene oxide is selected from a group represented by the following structure:

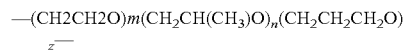

wherein m is a positive integer; wherein n and z are independently either zero or a positive integer, with the proviso that $0<m+n+z<20$.

In another embodiment, the silicon-containing polyether of the present invention is either a silane and/or siloxane composition represented by Formulas (IV) and/or (V) shown below:

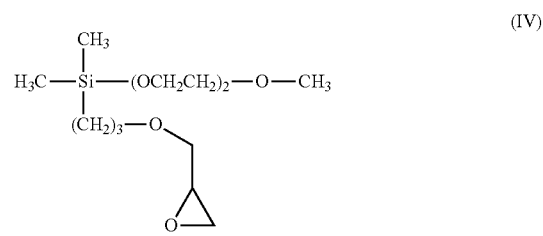

(IV)

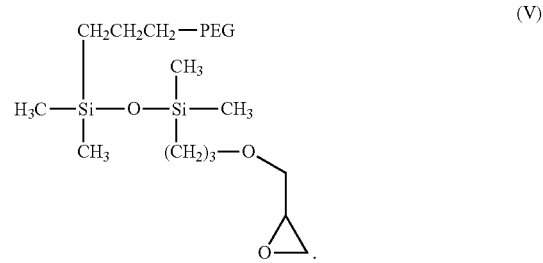

(V)

In this embodiment, the compounds according to Formulas (IV) and/or (V) are able to dissolve various lithium salts (e.g., $LiPF_6$, LiBOB and/or LiTFSI) at levels not possible for prior art electrolyte solvents. With regard to the compound of Formula (V), the PEG portion of this compound is in one embodiment, $-(OCH_2CH_2)_4OCH_3$. However, the compound of Formula (V) is not limited thereto. Rather, any suitable number of repeating units can be contained in the PEG portion of the compound of Formula (V).

In one embodiment, a silicon-containing electrolyte solvent in accordance with the present invention can dissolve a lithium salt (e.g., $LiPF_6$, LiBOB and/or LiTFSI) at a concentration of up to about 2 M, at a concentration of up to about 1.9M, at a concentration of up to about 1.8 M, at a concentration of up to about 1.7M, at a concentration of up to about 1.6 M, at a concentration of up to about 1.5M, at a concentration of up to about 1.4 M, at a concentration of up to about 1.3M, at a concentration of up to about 1.2 M, at a concentration of up to about 1.1M, or even at a concentration of up to about 1 M. Here, as well as elsewhere in the specification and claims, individual range limits can be combined to form closed ended ranges and/or additional non-disclosed ranges.

In one embodiment, the silicon-based compositions of the present invention are electrolyte solvents for various lithium salts and provide ionic conductivities of greater than about 0.5 mS/cm, or even greater than about 1 mS/cm, at room temperature (i.e., about 25° C. at standard pressure). Suitable lithium salts for use in conjunction with the electrolyte solvent compositions of the present invention include, but are not limited to, $LiClO_4$, $LiCF_3SO_3$, $LiBF_4$, $LiPF_6$, $LiAsF_6$, $LiN(SO_2CF_3)_2$, LiTFSI, LIBOB, or combinations of any two or more thereof. As would be apparent to those of skill in the art, other suitable lithium salts known to those of skill in the art can be utilized in conjunction with one or more of the silicon-based electrolyte solvent compositions of the present invention so long as such lithium salts are soluble in one or more of the silicon-based electrolyte solvent compositions of the present invention at a level of at least about 0.5 M, or at least about 0.75 M, or even at least about 1 M. Here, as well as elsewhere in the specification and claims, individual range limits can be combined to form closed ended ranges and/or additional non-disclosed ranges.

In one embodiment, the silicon-based electrolyte solvent compositions of the present invention are able to solubilize one or more suitable lithium salts without the use of one or more alkyl carbonate compounds. Accordingly, in this embodiment, a mixture of one or more silicon-based electrolyte solvent compositions of the present invention with one or more lithium salts is "free of" one or more alkyl carbonates. By "free of" it is meant that a mixture of one or more silicon-based electrolyte solvent compositions of the present invention with one or more lithium salts contains less than 5 weight percent of one or more alkyl carbonates, or less than 3 weight percent of one or more alkyl carbonates, or less than 1.5 weight percent of one or more alkyl carbonates, or less than 1 weight percent of one or more alkyl carbonates, or less than 0.5 weight percent of one or more alkyl carbonates, or less than 0.1 weight percent of one or more alkyl carbonates, or less than 0.01 weight percent of one or more alkyl carbonates, or less than 0.001 weight percent of one or more alkyl carbonates, or even none (i.e., zero weight percent) of one or more alkyl carbonates based on the total weight of the one or more silicon-based electrolyte solvent compositions of the present invention and the one or more lithium salts present. Here, as well as elsewhere in the specification and claims, individual range limits can be combined to form closed ended ranges and/or additional non-disclosed ranges.

In another embodiment, the present invention relates to blends of one or more silicone epoxy polyether solvents with one or more alkyl carbonate solvents. In one embodiment, such blends can be prepared to further enhance the ionic conductivity of the silicone epoxy polyether solvents of the present invention. In one embodiment, a blend comprising about 90 percent by volume of one or more silane epoxy polyether of the present invention is blended with about 10 percent by volume of one or more alkyl carbonate solvents. In one instance, 90 percent by volume of a silane epoxy polyether is blended with 10 percent by volume of a one to one mixture of ethylene carbonate and dimethyl carbonate. This mixture is then subjected to ionic conductivity measurements using 1 M LiPF$_6$. In another embodiment, about 80 percent by volume of one or more silane epoxy polyethers of the present invention are blended with 20 percent by volume of one or more alkyl carbonate solvents. In one instance, 80 percent by volume of a silane epoxy polyether is blended with 20 percent by volume of a one to one mixture of ethylene carbonate and dimethyl carbonate. This mixture is then subjected to ionic conductivity measurements using 1 M LiPF$_6$. In still another embodiment, 90 percent by volume of a silane epoxy polyether is blended with 10 percent by volume of a one to one mixture of ethylene carbonate and dimethyl carbonate. This mixture is then subjected to ionic conductivity measurements using 1M LiTFSI. In still yet another embodiment, about 80 percent by volume of one or more silane epoxy polyethers of the present invention are blended with 20 percent by volume of one or more alkyl carbonate solvents. In one instance, 80 percent by volume of a silane epoxy polyether is blended with 20 percent by volume of a one to one mixture of ethylene carbonate and dimethyl carbonate. This mixture is then subjected to ionic conductivity measurements using 1 M LiTFSI.

Given the above, in one embodiment the present invention relates to a blend of one or more silane and/or siloxane compositions of the present invention with one or more alkyl carbonate solvents. In one embodiment, the amount of the one or more silane and/or siloxane compositions of the present invention in such blends are at least about 90 percent by volume, at least about 80 percent by volume, at least about 60 percent by volume, at least about 70 percent by volume, at least about 60 percent by volume, or even about 50 percent by volume, with the remainder of the blend being the one or more alkyl carbonates. Suitable alkyl carbonates include, but are not limited to, ethylene carbonate, dimethyl carbonate, or mixtures thereof. In one embodiment, if a mixture of ethylene carbonate and dimethyl carbonate is utilized any ratio by volume of ethylene carbonate to dimethyl carbonate in the range of about 95:5 to about 5:95 can be utilized. In one embodiment, a 1:1 mixture of ethylene carbonate and dimethyl carbonate is utilized as the alkyl carbonate portion of a blend in accordance with the present invention. Here, as well as elsewhere in the specification and claims, individual range limits can be combined to form closed ended ranges and/or additional non-disclosed ranges.

Although not limited thereto, representative synthesis routes for synthesizing the compounds of Formulas (IV) and (V) will be discussed below. The compound of Formula (IV) above can be synthesized according to the reaction below:

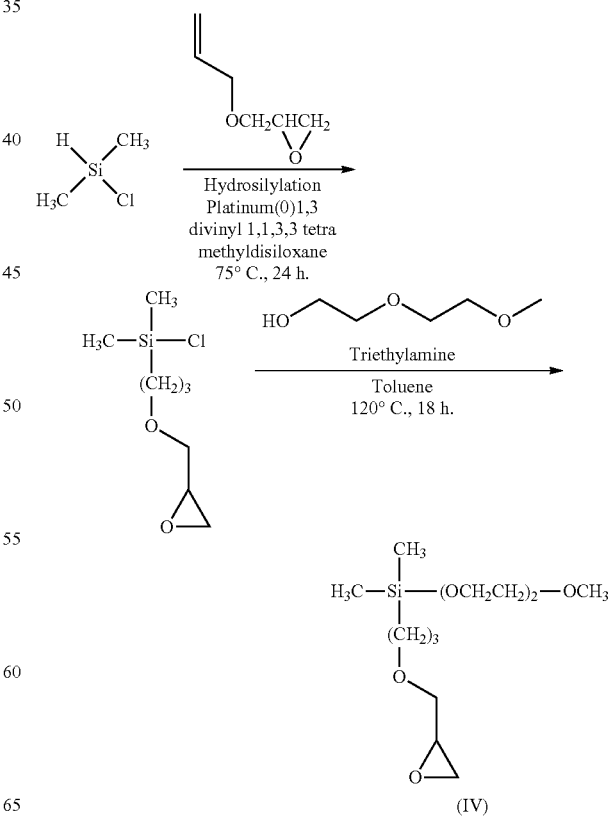

Scheme 1-Synthesis of Formula (IV)

Chlorodimethylsilane (15.0 grams, 0.159 moles) and allyl glycidyl ether (19.10 grams, 0.167 moles) are dissolved in 50 mL of THF in a three neck round bottom flask. To this is added a platinum catalyst (Platinum(0) 1,3-divinyl-1,1,3,3-tetramethyldisiloxane) and the reaction is performed at 75° C. for 24 hours under a nitrogen atmosphere to yield a product with an appended glycidyl ether moiety. After 24 hours, the reaction mixture is cooled to room temperature and a mixture of diethylene glycol monomethylether (19.1 grams, 0.158 moles), triethylamine (16.08 grams, 0.158 moles) in toluene is added drop wise and the mixture is refluxed at 120° C. for 18 hours. After the reaction, the precipitated solid is filtered out and fresh hexane is added. The solid is filtered and the solvent is removed under vacuum. An NMR run of the reaction product of Scheme 1 confirms the formation the compound of Formula (IV). The presence of minor quantities of reactants, namely, allyl glycidyl ether and diethylene glycol monomethylether is also evident from the NMR spectrum.

Turning to the compound of Formula (V), this compound can be synthesized via the reaction shown below:

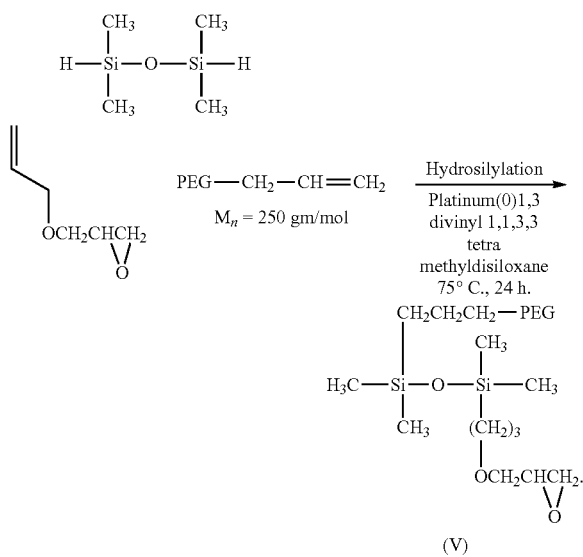

Tetramethyl disiloxanedihydride (20 grams, 0.149 moles) is combined with allyl glycidyl ether (16.98 grams, 0.164 moles) and allyl methoxy polyether ($M_n$=250 grams/mole—37.25 grams, 0.149 moles) in a three neck round bottom flask. To this platinum catalyst (Platinum(0) 1,3-divinyl-1,1,3,3-tetramethyldisiloxane) is added and the reaction is heated at 75° C. for 24 hours under a nitrogen atmosphere to yield the compound of Formula (V). An NMR run of the reaction product of Scheme 2 confirms the formation the compound of Formula (V). The presence of minor quantities of reactants, namely, allyl glycidyl ether and allyl methoxy polyether is also evident from the NMR spectrum.

Ionic Conductivity Measurements:

LiPF$_6$ salt is dissolved in different concentrations in both Formula (IV) and Formula (V), with the compounds of Formulas (IV) and (V) acting as the solvent at various concentrations as detailed in Table 1 below. The ionic conductivities of the resulting solutions in all of the examples contained herein are measured using a Hach Sension 7 conductivity meter. The ionic conductivity values are reported in Tables 1 through 3 below.

TABLE 1

Ionic Conductivity Measurements Using LiPF$_6$

| Solvent | Ionic Conductivity (mS/cm) | Temperature (° C.) |
|---|---|---|
| Formula (IV) - 1.00M | 1.01 | 24.6 |
| Formula (IV) - 1.25M | 1.15 | 25.0 |
| Formula (IV) - 1.50M | 1.10 | 25.1 |
| Formula (V) - 1.00M | 0.60 | 27.1 |

Similarly, ionic conductivity measurements are determined utilizing LiTFSI at different concentrations in the compound of Formula (IV). In this instance, the compound of Formula (IV) acts as the solvent for the varying concentrations of LiTFSI detailed in Table 2.

TABLE 2

Ionic Conductivity Measurements Using LiTFSI

| Solvent | Ionic Conductivity (mS/cm) | Temperature (° C.) |
|---|---|---|
| Formula (IV) - 0.8M | 1.35 | 25.0 |
| Formula (IV) - 1.0M | 1.40 | 25.0 |
| Formula (IV) - 1.25M | 1.27 | 25.0 |

The ionic conductivity of 1 M LiPF$_6$ dissolved in a solvent blend prepared using a 1:1 mixture of ethylene carbonate (EC) and dimethyl carbonate (DMC) with the compound of Formula (IV) is prepared as detailed in Table 3. In one instance, 90 percent by volume of Formula (IV) is blended with 10 percent by volume of a one to one mixture of ethylene carbonate (EC) and dimethyl carbonate (DMC). In another embodiment, about 80 percent by volume of Formula (IV) is blended with 20 percent by volume of a one to one mixture of ethylene carbonate (EC) and dimethyl carbonate (DMC). Then, the ionic conductivities of the resulting solutions are determined as described above. The results thereof are contained in Table 3.

TABLE 3

Ionic Conductivity Measurements in Blended Solvents Using 1M LiPF$_6$

| Solvent Blend for 1M LiPF$_6$ | Ionic Conductivity (mS/cm) | Temperature (° C.) |
|---|---|---|
| 90% Formula (IV)/10% of 1:1 EC/DMC | 1.7 | 26.0 |
| 80% Formula (IV)/20% of 1:1 EC/DMC | 2.5 | 26.0 |

Further, the ionic conductivity of 1 M LiTFSI dissolved in a solvent blend prepared using a 1:1 mixture of ethylene carbonate (EC) and dimethyl carbonate (DMC) with the compound of Formula (IV) is prepared as detailed in Table 4. In one instance, 90 percent by volume of Formula (IV) is blended with 10 percent by volume of a one to one mixture of ethylene carbonate (EC) and dimethyl carbonate (DMC). In another embodiment, about 80 percent by volume of Formula (IV) is blended with 20 percent by volume of a one to one mixture of ethylene carbonate (EC) and dimethyl carbonate (DMC). Then, the ionic conductivities of the resulting solutions are determined as described above. The results thereof are contained in Table 4.

TABLE 4

Ionic Conductivity Measurements in Blended Solvents Using 1M LiTFSI

| Solvent Blend for 1M LiPF$_6$ | Ionic Conductivity (mS/cm) | Temperature (° C.) |
|---|---|---|
| 90% Formula (IV)/10% of 1:1 EC/DMC | 2.1 | 26.0 |
| 80% Formula (IV)/20% of 1:1 EC/DMC | 3.1 | 26.0 |

Thus, as can be seen from the data contained in Tables 1 through 4, the silicon-based electrolyte solvent compositions of the present invention yield desirable ionic conductivities at various concentrations at room temperature. In light of the above, the compounds of the present invention are, in one embodiment, suitable for use as an electrolyte solvent in lithium ion batteries, electrochemical super-capacitors (ultra-capacitors), lithium ion capacitors, etc.

While in accordance with the patent statutes the best mode and certain embodiments of the invention have been set forth, the scope of the invention is not limited thereto, but rather by the scope of the attached. As such, other variants within the spirit and scope of this invention are possible and will present themselves to those skilled in the art.

What is claimed is:

1. A silicon-containing polyether electrolyte solvent composition comprising:
   (a) at least one compound selected from the compositions represented by the following structure:

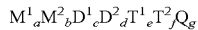

wherein M$^1$ is selected from R$^1$R$^2$R$^3$SiO$_{1/2}$ or M' a monovalent organic radical containing one or more heteroatoms O, N and/or S; wherein M$^2$ is selected from R$^4$R$^5$R$^6$SiO$_{1/2}$; wherein D$^1$ is selected from R$^7$R$^8$SiO$_{2/2}$ or D' a divalent organic radical containing one or more heteroatoms O, N and/or S; wherein D$^2$ is selected from R$^9$R$^{10}$SiO$_{2/2}$; wherein T$^1$ is selected from R$^{11}$SiO$_{3/2}$ or T' a trivalent organic radical containing one or more heteroatoms O, N and/or S; wherein T$^2$ is selected from R$^{13}$SiO$_{3/2}$; wherein Q is selected from SiO$_{4/2}$ or Q' a tetravalent organic radical containing one or more heteroatoms O, N and/or S;
   R$^1$, R$^2$, R$^3$, R$^5$, R$^6$, R$^7$, R$^8$, R$^{10}$, and R$^{11}$ are each independently selected from monovalent hydrocarbon radicals having from 1 to about 10 carbon atoms; monovalent hydrocarbon heteroatom-containing radicals having from 1 to about 10 carbon atoms wherein the one or more heteroatoms are selected from one or more halogens, O, N, or combinations of any two or more thereof; or monovalent polyalkylene oxide residuals;
   R$^4$, R$^9$ and R$^{13}$ are each independently selected from monovalent radicals that contain an oxirane moiety, with the proviso that at least one of R$^1$, R$^2$, R$^3$, R$^5$, R$^6$, R$^7$, R$^8$, R$^{10}$, R$^{11}$, M', D', T' or Q' contains a polyalkylene oxide residual if none of R$^4$, R$^9$ and R$^{13}$ contains a polyalkylene oxide residual;
   and wherein a, b, c, d, e, f, and g are independently selected from either zero or a positive integer subject to the provisos that 0<a+b+c+d+e+f+g<50 and b+d+f+g>0.

2. The composition of claim 1, wherein the polyalkylene oxide is selected from group represented by the following structure:

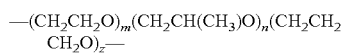

wherein m is a positive integer; wherein n and z are independently either zero or a positive integer, with the proviso that 0<m+n+z<20.

3. The composition of claim 1, wherein the composition is an electrolytic solvent for at least one lithium salt.

4. The composition of claim 3, wherein the lithium salt is selected from one or more of LiClO$_4$, LiCF$_3$SO$_3$, LiBF$_4$, LiPF$_6$, LiAsF$_6$, LiN(SO$_2$CF$_3$)$_2$, LiTFSI, LIBOB), or combinations of any two or more thereof.

5. The composition of claim 3, wherein the lithium salt is LiPF$_6$.

6. The composition of claim 1, wherein the composition is an electrolytic solvent for at least one lithium salt and wherein the electrolytic solvent is capable of solubilizing up to about 2 M of the one or more lithium salts.

7. The composition of claim 1, wherein the composition is an electrolytic solvent for at least one lithium salt and wherein the electrolytic solvent is capable of solubilizing up to about 1.9 M of the one or more lithium salts.

8. The composition of claim 1, wherein the composition is an electrolytic solvent for at least one lithium salt and wherein the electrolytic solvent is capable of solubilizing up to about 1.8 M of the one or more lithium salts.

9. The composition of claim 1, wherein the composition is an electrolytic solvent for at least one lithium salt and wherein the electrolytic solvent is capable of solubilizing up to about 1.7 M of the one or more lithium salts.

10. The composition of claim 1, wherein the composition is an electrolytic solvent for at least one lithium salt and wherein the electrolytic solvent is capable of solubilizing up to about 1.5 M of the one or more lithium salts.

11. The composition of claim 1, wherein the composition is an electrolytic solvent for at least one lithium salt and wherein the electrolytic solvent is capable of solubilizing up to about 1.2 M of the one or more lithium salts.

12. The composition of claim 1, wherein the composition is an electrolytic solvent for at least one lithium salt and wherein the electrolytic solvent is capable of solubilizing up to about 1 M of the one or more lithium salts.

13. The composition of claim 1, wherein the combination of a composition in accordance with claim 1 and at least one lithium salts yields a solution having an ionic conductivity of greater than about 0.5 mS/cm at room temperature.

14. The composition of claim 1, wherein the combination of a composition in accordance with claim 1 and at least one lithium salts yields a solution having an ionic conductivity of greater than about 1 mS/cm at room temperature and wherein such solution is free of one or more alkyl carbonate compounds.

15. The composition of claim 1, wherein the electrolyte solvent composition further comprises from about 1 percent by volume to about 10 percent by volume of one or more of a compound selected from allyl glycidyl ethers, diethylene glycol monomethylethers, allyl methoxy polyethers, or any combination of two or more thereof in combination with the one or more silicon-containing polyether compounds.

16. The composition of claim 1, wherein the electrolyte solvent composition further comprises at least one alkyl carbonate compound in combination with one or more silicon-containing polyether compounds.

17. The composition of claim 16, wherein the at least one alkyl carbonate is selected from ethylene carbonate, dimethyl carbonate, or mixtures thereof.

18. The composition of claim 16, wherein the at least one alkyl carbonate is present in a range of about 20 to about 50 percent by volume based on the total volume of the one or more silicon-containing polyether compounds and the one or more alkyl carbonates.

19. The silicon-containing polyether electrolyte solvent composition of claim 1 comprising:
(a) at least one compound selected from the compositions represented by the Formulas (IV) and/or (V):

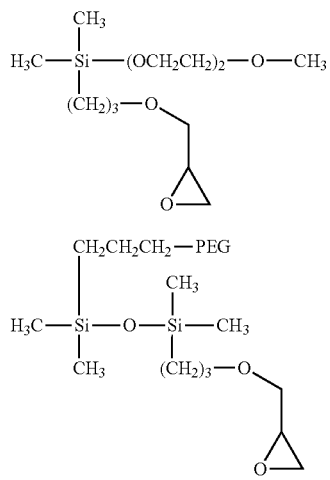

wherein the PEG portion of the compound of Formula (V) represents —(OCH$_2$CH$_2$)$_4$OCH$_3$.

20. The composition of claim 19, wherein the composition is an electrolytic solvent for at least one lithium salt selected from LiClO$_4$, LiCF$_3$SO$_3$, LiBF$_4$, LiPF$_6$, LiAsF$_6$, LiN(SO$_2$CF$_3$)$_2$, LiTFSI, LiBOB, or combinations of any two or more thereof.

21. The composition of claim 20, wherein the lithium salt is selected from one or more of LiPF$_6$, LiBOB and/or LiTFSI.

22. The composition of claim 20, wherein the lithium salt is LiPF6.

23. The composition of claim 19, wherein the composition is an electrolytic solvent for at least one lithium salt and wherein the electrolytic solvent is capable of solubilizing up to about 2 M of the one or more lithium salts.

24. The composition of claim 19, wherein the composition is an electrolytic solvent for at least one lithium salt and wherein the electrolytic solvent is capable of solubilizing up to about 1.9 M of the one or more lithium salts.

25. The composition of claim 19, wherein the composition is an electrolytic solvent for at least one lithium salt and wherein the electrolytic solvent is capable of solubilizing up to about 1.8 M of the one or more lithium salts.

26. The composition of claim 19, wherein the composition is an electrolytic solvent for at least one lithium salt and wherein the electrolytic solvent is capable of solubilizing up to about 1.7 M of the one or more lithium salts.

27. The composition of claim 19, wherein the composition is an electrolytic solvent for at least one lithium salt and wherein the electrolytic solvent is capable of solubilizing up to about 1.5 M of the one or more lithium salts.

28. The composition of claim 19, wherein the composition is an electrolytic solvent for at least one lithium salt and wherein the electrolytic solvent is capable of solubilizing up to about 1.2 M of the one or more lithium salts.

29. The composition of claim 19, wherein the composition is an electrolytic solvent for at least one lithium salt and wherein the electrolytic solvent is capable of solubilizing up to about 1 M of the one or more lithium salts.

30. The composition of claim 19, wherein the combination of a composition in accordance with claim 1 and at least one lithium salts yields a solution having an ionic conductivity of greater than about 1 mS/cm at room temperature.

31. The composition of claim 19, wherein the combination of a composition in accordance with claim 1 and at least one lithium salts yields a solution having an ionic conductivity of greater than about 1 mS/cm at room temperature and wherein such solution is free of one or more alkyl carbonate compounds.

32. The composition of claim 19, wherein the composition of Formula (IV) is synthesized according to the following reaction scheme:

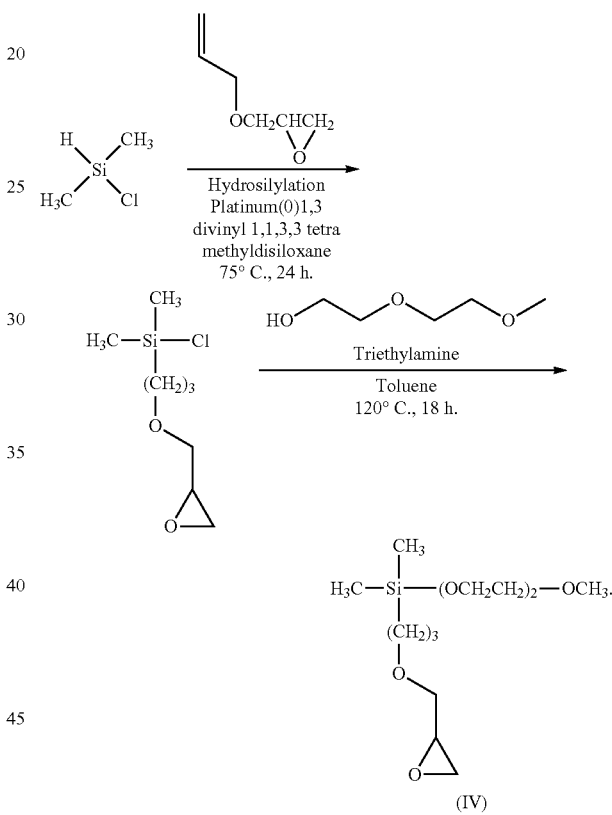

33. The composition of claim 19, wherein the composition of Formula (V) is synthesized according to the following reaction scheme:

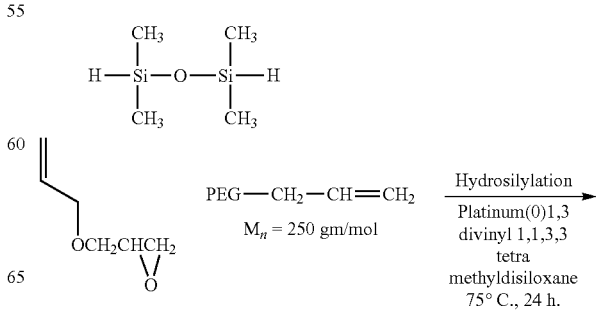

-continued

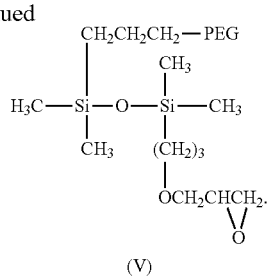

(V)

34. The composition of claim 19, wherein the electrolyte solvent composition further comprises from about 1 percent by volume to about 10 percent by volume of one or more of a compound selected from allyl glycidyl ethers, diethylene glycol monomethylethers, allyl methoxy polyethers, or any combination of two or more thereof in combination with the one or more silicon-containing polyether compounds.

35. The composition of claim 19, wherein the electrolyte solvent composition further comprises at least one alkyl carbonate compound in combination with one or more silicon-containing polyether compounds.

36. The composition of claim 35, wherein the at least one alkyl carbonate is selected from ethylene carbonate, dimethyl carbonate, or mixtures thereof.

37. The composition of claim 35, wherein the at least one alkyl carbonate is present in a range of about 20 to about 50 percent by volume based on the total volume of the one or more silicon-containing polyether compounds and the one or more alkyl carbonates.

38. An electrochemical device comprising the composition of claim 1.

39. An electrochemical device comprising the composition of claim 19.

* * * * *